Patented Jan. 23, 1951

2,539,316

UNITED STATES PATENT OFFICE 2,539,316

GLASS FILTERING ULTRA VIOLET RADIATIONS AND OBJECTS MADE THEREWITH

Roger Francois Desire Navarre, alias Malherbe, Faisanderie, France

No Drawing. Application July 10, 1947, Serial No. 760,100. In France March 20, 1946

Section 1, Public Law 690, August 8, 1946
Patent expires March 20, 1966

2 Claims. (Cl. 106—52)

It is a well-known fact that ultra violet radiations exert on certain substances a specific action which has been often resorted to chiefly in the field of photo-electricity, photo-chemistry, biology, food-stuff industry, fluorescence, luminous decoration and the like. As any source of light emits ultra violet radiations, it is apparent that it is of interest for these various applications to attempt separating such radiations so as to constrain them to act practically alone on the substances to be treated.

The intensity, nature and area of the spectrum of the irradiating source which is to be used in each case depends on the effect sought for and it is therefore necessary to produce filters that allow the passage only of the band of useful wave-lengths from said sources.

My invention has for its object, by way of a novel industrial article, finished products and chiefly receivers, flasks, laboratory material, optical parts, decorative objects and the like executed partly or completely by means of a glass filtering the ultra violet radiations, i. e. that does not allow in practice the passage of such radiations. My invention includes also more particularly a glass of a novel composition that is advantageously applicable to the production of such objects.

The glass obtained according to my invention has as basis black nickel oxide in accordance with the well known investigations made by Wood who showed that this oxide prevented the passage of the visible radiations of the spectrum, while allowing the passage of ultra violet rays. However, my improved glass in addition to its remarkable transparency with reference to ultra violet radiations and in contradistinction with Wood's glass as found in the trade, shows the advantage of being easily machined and of allowing in particular the execution of blowing, compressing, rolling, drawing and cutting operations as usually provided in the glass industry.

This glass is in principle constituted by a mixture of sand, soda, potash, baryta, potassium nitrate, dolomite and black nickel oxide. In such a mixture in which the nickel oxide has to play as stated the part that consists in eliminating the visible radiations while allowing the passage of ultra violet, the sand, soda and potash are intended to produce a glass showing a sufficient affinity with ordinary glass and capable in particular to be welded thereto; the baryta seems to bestow a greater hardness and a greater brilliancy to the glass whereas the dolomite plays somewhat the part of a binder furthering the obtention of a cohesive homogeneous mixture.

By way of an example and by no means in a binding sense, I give hereinbelow a practical composition of a glass allowing the passage of radiations of the spectrum comprised between 2947 Å. and 4000 Å.

| | |
|---|---|
| Sand | About 50 parts in weight |
| Soda | About 5 parts in weight |
| Potash | About 15 parts in weight |
| Baryta | About 10 parts in weight |
| Potassium nitrate | About 2.5 parts in weight |
| Black nickel oxide | About 12.5 parts in weight |
| Dolomite | About 5 parts in weight |

By increasing more or less the proportion of black nickel oxide, it is possible to reduce the width of the band of wave-lengths passing through the spectrum and to restrict exactly said band in the zone of the ultra violet while reducing however the proportion of ultra violet radiations that are admitted to pass. On the contrary, by reducing said proportion of nickel oxide, it is possible to extend the breadth of the band of wave-lengths towards the visible radiations, which may be of use for certain applications.

Among other interesting applications of my invention, it may be mentioned by way of a non-limiting example that when it is desired to photograph only the ultra-violet emission of any phenomenon whatever, it is possible to associate the optic system if made of quartz with a filtering screen made of glass of the above composition.

It is also possible in an advantageous manner to make the optic parts of the camera of the same improved filtering glass.

A further application that may be interesting for photographic work consists, when focussing and observing before view taking, in replacing the conventional ground glass or the apparent surface of the finder either by a sheet of filtering glass covered on the surface to be considered by fluorescent substances producing luminous waves entering the camera obscura when the optic parts of the apparatus is transparent or else said ground glass or finder surface may be replaced when said optic parts are made of or provided with a filter made of such filtering glass, by a transparent plate coated with the same fluorescent material facing preferably the object glass for removing the drawbacks due to the absorbing power of the carrier plate.

For the same reasons, it is also possible to execute photo-cells, the enclosing material of which is formed partly of glass, filtering the ultra violet radiations due to the illuminating means available or to an auxiliary source of light, such radiations having for their object to further the ionisation of the rarefied gases of the cell.

In the field of direct photo-chemical reactions, i. e. of chemical reactions that are furthered or produced through the action of light such as oxidising, reducing, polymerizing, decomposition and the like reactions, the latter may be executed according to my invention in chambers that allow the passage only of the desired radiations and transmit them immediately to the material undergoing treatment.

In the field of biology, it is possible to study the action of ultra violet rays on different organic substances.

As for the bactericidal action, of ultra-violet rays, it is indisputable that for an optimum result it is necessary to do away with or to control to a maximum the agents absorbing these radiations such as the glass enclosing the substances to be treated.

By reason of its great ease of machining, all the apparatuses made use of in laboratories may be made of said material, as for instance test tubes, balloons, flasks, vats, cover slips, ground members and the like. Moreover it is also possible to machine this glass to form optic members such as prisms or lenses and also of course into shaped screens and bulbs.

Taking into account Hobert's work on sanguine regeneration, the transfusion of blood may be performed through the agency of an apparatus made of filtering glass of the type disclosed.

It is also possible to execute with filtering glass of the type disclosed the flasks or packages of food-stuff or of products irradiated through any means of the abovementioned or suitable kind and it is possible to bring to a substantial extent through mere exposure to light a remedy to the instability of such products due to their ageing.

Ultra-violet rays filtered by a glass according to the invention may also act on the conditions prevailing on the plant, and thereby reinforce and equilibrate through a suitable proportion or control the accelerated development of the plant.

It is also possible to produce a decorative effect in show-cases and the like by using the action of ultra violet on fluorescent products that may be seen through windows of transparent glass welded to or inserted on the filtering glass at predetermined locations.

What I claim is:

1. A glass resulting from the fusion of sand, soda, potash, baryta, potassium nitrate, dolomite and black nickel oxide, the proportions being substantially as follows in weight for 100 parts:

|  | Parts |
|---|---|
| Sand | 50 |
| Soda | 5 |
| Potash | 15 |
| Baryta | 10 |
| Potassium nitrate | 2.5 |
| Black nickel oxide | 12.5 |
| Dolomite | 5 |

2. As novel articles of manufacture, manufactured objects consisting of glass filtering ultra-violet radiations, said glass resulting from the fusion of sand, soda, potash, baryta, potassium nitrate, dolomite and black nickel oxide, the proportions being substantially as follows in weight for 100 parts:

|  | Parts |
|---|---|
| Sand | 50 |
| Soda | 5 |
| Potash | 15 |
| Baryta | 10 |
| Potassium nitrate | 2.5 |
| Black nickel oxide | 12.5 |
| Dolomite | 5 |

ROGER FRANCOIS DESIRE NAVARRE, ALIAS MALHERBE.

REFERENCES CITED

The following references are of record in the file of this patent:

UNITED STATES PATENTS

| Number | Name | Date |
|---|---|---|
| 1,305,793 | Gage et al. | June 3, 1919 |